US012112697B2

(12) United States Patent
Xu

(10) Patent No.: US 12,112,697 B2
(45) Date of Patent: Oct. 8, 2024

(54) DISPLAY DEVICE AND DISPLAY METHOD

(71) Applicant: Wuhan Tianma Micro-Electronics Co., Ltd., Wuhan (CN)

(72) Inventor: Mingxia Xu, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 84 days.

(21) Appl. No.: 17/946,319

(22) Filed: Sep. 16, 2022

(65) Prior Publication Data

US 2023/0395020 A1 Dec. 7, 2023

(30) Foreign Application Priority Data

Jun. 6, 2022 (CN) ........................ 202210628409.2

(51) Int. Cl.
*G09G 3/3233* (2016.01)

(52) U.S. Cl.
CPC ... *G09G 3/3233* (2013.01); *G09G 2320/0242* (2013.01); *G09G 2320/0257* (2013.01); *G09G 2360/16* (2013.01)

(58) Field of Classification Search
CPC .................................................... G09G 3/3233
USPC ............................................. 345/440.1, 204
See application file for complete search history.

(56) References Cited

U.S. PATENT DOCUMENTS

2008/0309603 A1* 12/2008 Feng .................... G09G 3/3648 345/89
2010/0060794 A1* 3/2010 Kanai ...................... H04N 5/20 348/739
2010/0272334 A1* 10/2010 Yamada ................. G01N 1/312 382/128
2012/0105513 A1* 5/2012 Shin ..................... G09G 3/3607 345/88
2014/0306984 A1* 10/2014 Choi ........................ G09G 5/06 345/591
2015/0009188 A1* 1/2015 Choi ........................ G09G 3/20 345/204
2019/0114975 A1* 4/2019 Chen .................... G09G 3/3426
2021/0407368 A1* 12/2021 Gao ..................... G09G 3/3685
2022/0343845 A1* 10/2022 Wu ........................ G09G 3/035

FOREIGN PATENT DOCUMENTS

CN 107248389 A 10/2017
CN 111640390 A 9/2020

* cited by examiner

*Primary Examiner* — Prabodh M Dharia
(74) *Attorney, Agent, or Firm* — Anova Law Group, PLLC

(57) ABSTRACT

A display method includes obtaining input data of a first color sub-pixel in an N-th frame and in an (N−1)-th frame; looking up, in a first lookup table, predetermined input data of the first color sub-pixel in the N-th frame and a predetermined compensation value corresponding to the input data of the first color sub-pixel in the (N−1)-th frame; obtaining input data of a second color sub-pixel; looking up, in a second lookup table, a first impact factor of input data of the second color sub-pixel in the (N−1)-th frame to the predetermined input data; calculating an actual compensation value at least according to the predetermined compensation value and the first impact factor; calculating target input data of the first color sub-pixel in the N-th frame; and performing display, by the first color sub-pixel, according to the target input data.

13 Claims, 11 Drawing Sheets

DISPLAY DEVICE AND DISPLAY METHOD

CROSS-REFERENCE TO RELATED APPLICATION

This application claims priority to Chinese Patent Application No. 202210628409.2, filed on Jun. 6, 2022, the entire content of which is incorporated herein by reference.

TECHNICAL FIELD

The present disclosure relates to the display technology field and, more particularly, to a display device and a display method.

BACKGROUND

As display technology continues to develop, a display device is widely used, and a higher requirement is imposed on the display device. An organic light-emitting diode (OLED) display device has advantages of high light-emitting brightness, light and thin volume, fast response speed, easy implementation of color display and large-screen display, etc., and has a broad application prospect.

However, in an existing OLED product, due to different electrical properties of electro-luminescent (EL) materials, the EL materials (such as red (R) EL material, green (G) EL material, and blue (B) EL material) have different response speeds to an activation current under a same activation threshold voltage. In some special application scenarios, for example, when dragging the screen and fast refresh are performed in low brightness, if a refresh frequency is 120 Hz, an abnormal phenomenon, such as smear, is easy to occur, which affects the display effect.

SUMMARY

Embodiments of the present disclosure provide a display method of a display device. The display device includes a plurality of pixel units and a memory. One pixel unit of the plurality of pixel units includes a first color sub-pixel and a second color sub-pixel. The memory stores a lookup table. The lookup table includes a first lookup table and a second lookup table. The first lookup table includes a predetermined compensation value corresponding to predetermined input data of the first color sub-pixel in an N-th frame and input data of the first color sub-pixel in an (N−1)-th frame. The second lookup table includes a first impact factor of input data of the second color sub-pixel in the same pixel unit with the first color sub-pixel to the predetermined input data of the first color sub-pixel in the N-th frame, N>1. The display method includes obtaining input data of the first color sub-pixel in the N-th frame and the input data of the first color sub-pixel in the (N−1)-th frame, looking up the predetermined input data of the first color sub-pixel in the N-th frame and the predetermined compensation value corresponding to the input data of the first color sub-pixel in the (N−1)-th frame in the first lookup table, obtaining the input data of the second color sub-pixel in the same pixel unit in the (N−1)-th frame, looking up the first impact factor of the input data of the second color sub-pixel in the (N−1)-th frame to the predetermined input data of the first color sub-pixel in the N-th frame from the second lookup table, calculating an actual compensation value at least according to the predetermined compensation value and the first impact factor, calculating target input data of the first color sub-pixel in the N-th frame according to the actual compensation value and the predetermined input data of the first color sub-pixel in the N-th frame, and performing display by the first color sub-pixel according to the target input data.

DETAILED DESCRIPTION OF THE EMBODIMENTS

Embodiments of the present disclosure are described in detail in connection with the accompanying drawings. Unless otherwise specified, a relative arrangement of components and processes, a numerical expression, and a numerical value described in embodiments of the present disclosure are not intended to limit the scope of the present disclosure.

Description of embodiments of the present disclosure is merely exemplary and illustrative and is not intended to limit the present disclosure.

A technology, a method, and a device known to those of ordinary skill in the art are not discussed in detail, but such the technology, method, and device should be considered as a part of the specification when it is appropriate.

In all examples shown and discussed herein, any specific value should only be considered illustrative and should not be considered a limitation. Thus, another exemplary embodiment may have a different value.

It is apparent to those skilled in the art that various modifications and variations can be made in the present disclosure without departing from the spirit or scope of the present disclosure. Thus, the present disclosure is intended to cover the modifications and variations of the present disclosure that are within the scope of the corresponding claims (claimed technical solutions) and the scope of equivalents of the claims. Embodiments of the present disclosure may be combined with each other when there are no conflicts.

A similar numeral and letter may refer to a similar item in the accompanying drawings. Thus, once an item is defined in a drawing, the item may not need to be further discussed in the subsequent drawings.

An OLED display device, such as an active matrix organic light emitting diode (AMOLED) display device, is widely used and attracts attention due to advantages of self-luminescence, a wide viewing angle, and a high contrast ratio. However, since electrical properties of light-emitting materials in such the display device are different, the display device may have different response speeds to a turn-on current. When the screen is dragged or refreshed quickly in a low grayscale, an abnormal display phenomenon, such as smear, may easily occur, which may affect the display effect. Thus, the present disclosure provides a display method of a display device to improve the abnormal display problem caused by smear.

The display method is described in detail in connection with the accompanying drawings and embodiments of the present disclosure.

Figure 1:
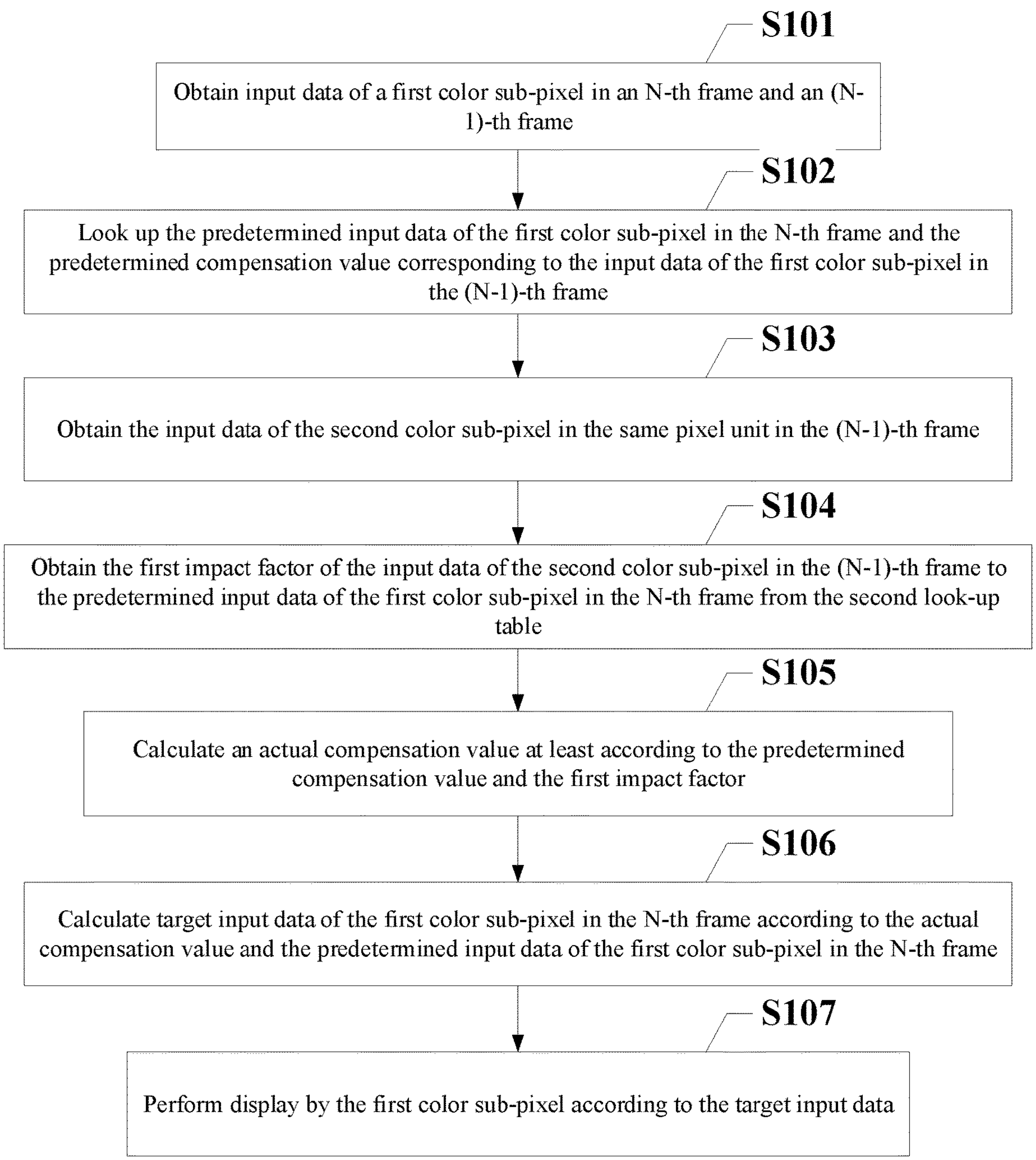
FIG. 1 is a schematic flowchart of a display method of a display device according to some embodiments of the present disclosure.
Figure 2:
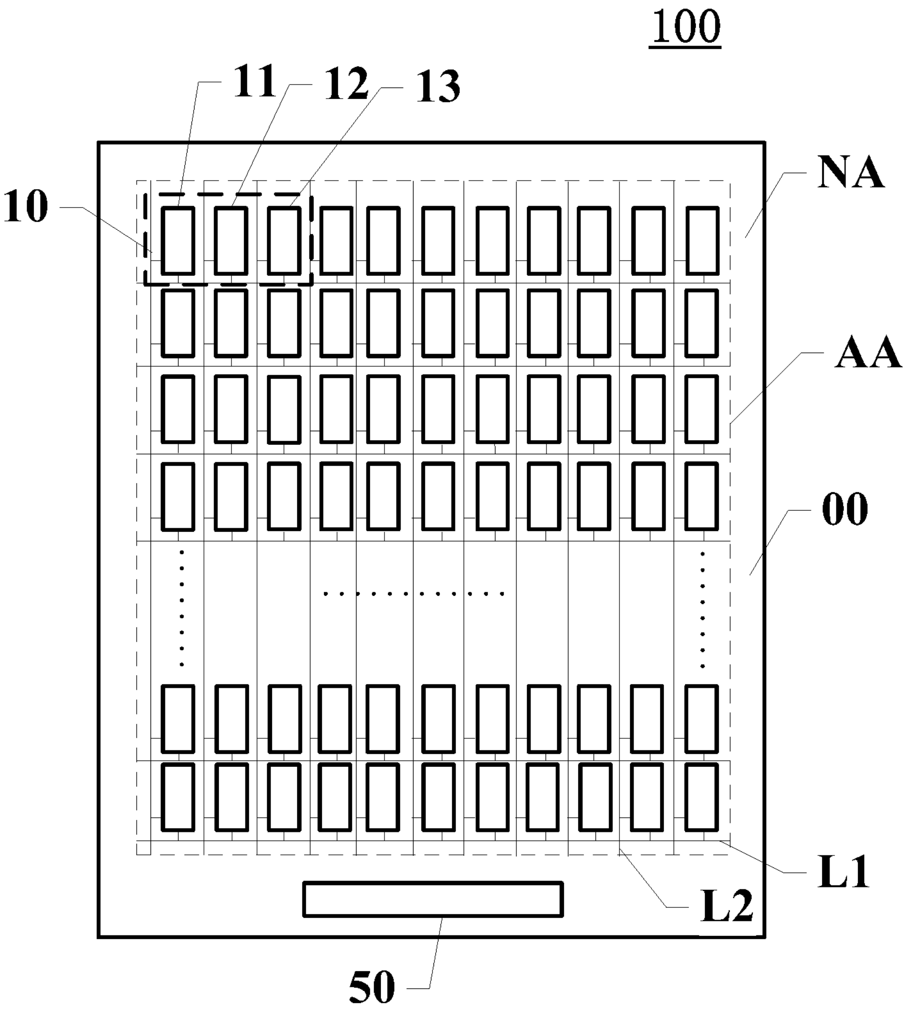
FIG. 2 is a schematic structural diagram of a display device according to some embodiments of the present disclosure.

FIG. 1 is a schematic flowchart of a display method of a display device according to some embodiments of the present disclosure. FIG. 2 is a schematic structural diagram of a display device according to some embodiments of the present disclosure. Referring to FIG. 1 and FIG. 2, embodiments of the present disclosure provide the display method of the display device. The display device includes a plurality of pixel units 10 and a memory 50.

A pixel unit 10 of the plurality of pixel units 10 includes a first color sub-pixel 11 and a second color sub-pixel 12. The memory 50 may store a look-up table. The look-up table may include a first look-up table and a second look-up table. The first look-up table may include predetermined input data of the first color sub-pixel 11 in an N-th frame and a predetermined compensation value corresponding to input data of the first color sub-pixel 11 in an (N−1)-th frame. The second lookup table may include a first impact factor of input data of the second color sub-pixel 12 in the (N−1)-th frame to the predetermined input data of the first color sub-pixel 11 in the same pixel unit 10. N may be greater than 1.

The display method includes the following processes.

At S101, the input data of the first color sub-pixel 11 in the N-th frame and the (N−1)-th frame is obtained.

At S102, the predetermined input data of the first color sub-pixel 11 in the N-th frame and the predetermined compensation value corresponding to the input data of the first color sub-pixel 11 in the (N−1)-th frame are looked up.

At S103, the input data of the second color sub-pixel 12 in the same pixel unit 10 in the (N−1)-th frame is obtained.

At S104, the first impact factor of the input data of the second color sub-pixel 12 in the (N−1)-th frame to the predetermined input data of the first color sub-pixel 11 in the N-th frame is obtained from the second look-up table.

At S105, an actual compensation value is calculated at least according to the predetermined compensation value and the first impact factor.

At S106, target input data of the first color sub-pixel 11 in the N-th frame is calculated according to the actual compensation value and the predetermined input data of the first color sub-pixel 11 in the N-th frame.

At S107, the first color sub-pixel 11 performs display according to the target input data.

FIG. 2 illustrates the display device of the present disclosure only by taking the display device with a rectangular structure as an example, which does not limit the actual shape of the display device. In some other embodiments of the present disclosure, the display device may also be in another shape besides a rectangular shape, such as a circular shape, an oval shape, or a non-rectangular special-shaped structure. Optionally, the display device may include a driver chip. The driver chip may include the memory 50. In some embodiments, the input data of embodiments of the present disclosure may be, for example, a display grayscale value corresponding to a sub-pixel or other feasible display data, which is not limited in the present disclosure.

In order to clearly illustrate the content of the present disclosure, FIG. 2 only shows the sub-pixels and a part of the signal lines connected to the sub-pixels in the display area, such as the gate lines L1 and the data lines L2. Although not shown in the drawing, in order to realize the display function, the display area of the display panel may also include a plurality of other signal lines, such as a clock signal line, a power supply voltage signal line, and a reset signal line. In addition, a pixel circuit may also be arranged in the display area, and a drive circuit may be arranged in the non-display area. FIG. 2 only illustrates the sub-pixels of the display device with a square structure, which does not represent the actual shape and quantity of the sub-pixels and does not limit the arrangement of the sub-pixels in the display device.

Figure 3:
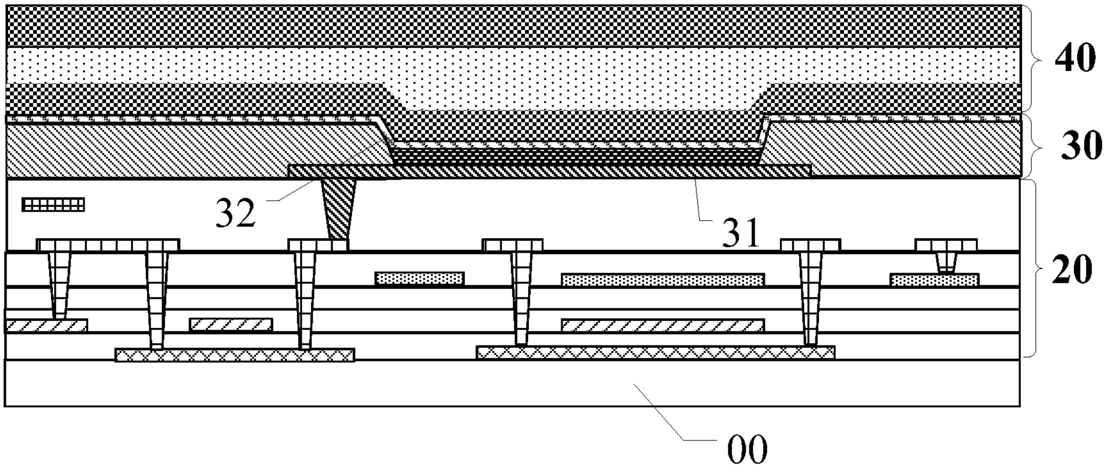
FIG. 3 is a schematic diagram showing a film layer of the display device according to some embodiments of the present disclosure.
Figure 4:
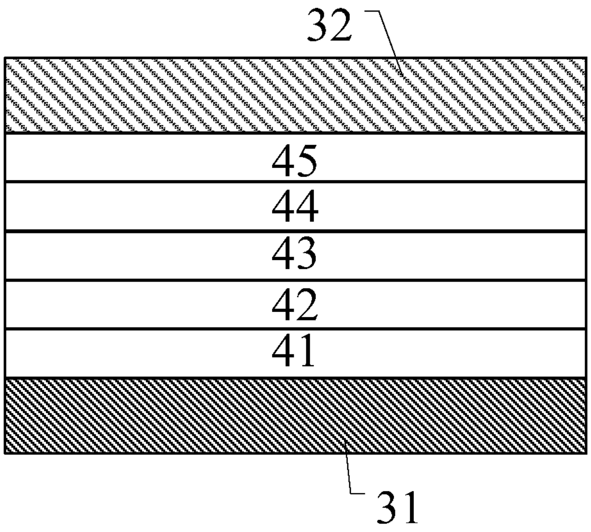
FIG. 4 is a schematic diagram showing a film layer of a light-emitting structure corresponding to sub-pixels of the display device according to some embodiments of the present disclosure.

In some embodiments, the display device provided by the embodiment of the present disclosure is an OLED display device. FIG. 3 is a schematic diagram showing a film layer of the display device according to some embodiments of the present disclosure. FIG. 4 is a schematic diagram showing a film layer of a light-emitting structure corresponding to sub-pixels of the display device according to some embodiments of the present disclosure. In some embodiments, the display device includes a substrate 00, an array layer 20 formed on the substrate 00, a light-emitting structure 30 arranged on the array layer 20, and a packaging layer 40 formed on a side of the light-emitting structure 30 away from the substrate.

In some embodiments, the light-emitting structure in the OLED display device may be formed in a multi-layer structure. For example, the emitting structure includes an anode 31, a hole injection layer 41, a hole transport layer 42, a light-emitting layer 43, an electron transport layer 44, an electron injection layer 45, and a cathode 32. In the same display device, the anode 31 and the light-emitting layer 43 may be independent for different sub-pixels, and the hole injection layer 41, the hole transport layer 42, the electron transport layer 45, the electron injection layer 46, and the cathode 32 may be shared by different sub-pixels.

Since materials of the light-emitting layers corresponding to the sub-pixels of different colors are different, turn-on voltages corresponding to the sub-pixels of different colors may be different. For example, a turn-on voltage corresponding to the red sub-pixel may be relatively small, and a turn-on voltage corresponding to the blue sub-pixel may be relatively large. When the blue sub-pixel is turned on, since the sub-pixels of different colors share the film layers, a certain carrier migration phenomenon may occur. For example, a lateral leakage current of the blue sub-pixel may affect the red sub-pixel neighboring to the blue sub-pixel, which may cause a phenomenon that the red sub-pixel may be lit up unintentionally. When target input data of a sub-pixel in the current frame is calculated, the target input data may be not only affected by the input data of the sub-pixel in the previous frame but also affected by the input data of other sub-pixels of different colors.

Referring still to FIG. 1 to FIG. 4, in the display method of the display device of the present disclosure, the display device includes the first color sub-pixel 11 and the second color sub-pixel 12. The memory 50 stores the first lookup table and the second lookup table. Table 1 and Table 2 illustrate the first lookup table and the second lookup table, respectively. The first lookup table includes the preset input data of the first color sub-pixel 11 in the N-th frame and the predetermined compensation value corresponding to the input data of the first color sub-pixel 11 in the (N−1)-th. P1 to P7 in Table 1 are input data values of the first color sub-pixel 11 in the current frame. S1 to S7 are input data values of the first color sub-pixels 11 in the previous frame. RO1 to RO28 are preset compensation values. The sub-pixels of different colors may correspond to different first look-up tables. When the input data is the data corresponding to the red sub-pixel, the corresponding predetermined compensation value may be looked up in the first look-up table corresponding to the red sub-pixel. When the input data is the data corresponding to the green sub-pixel, the corresponding predetermined compensation value may be looked up in the first lookup table corresponding to the green sub-pixel. When the input data is the data corresponding to the blue sub-pixel, the corresponding predetermined compensation value may be looked up in the first look-up table corresponding to the blue sub-pixel. In Table 1, the first lookup table only shows 7 input data values of the current frame and 7 input data values of the previous frame, which does not limit the actual number.

TABLE 1

| First lookup table | | | | | | | |
|---|---|---|---|---|---|---|---|
| | P1 | P2 | P3 | P4 | P5 | P6 | P7 |
| S1 | RO1 | RO2 | RO3 | RO4 | RO5 | RO6 | RO7 |
| S2 | — | RO8 | RO9 | RO10 | RO11 | RO12 | RO13 |
| S3 | — | — | RO14 | RO15 | RO16 | RO17 | RO18 |
| S4 | — | — | — | RO19 | RO20 | RO21 | RO22 |
| S5 | — | — | — | — | RO23 | RO24 | RO25 |
| S6 | — | — | — | — | — | RO26 | RO27 |
| S7 | — | — | — | — | — | — | RO28 |

A second lookup table includes the first impact factor of the input data of the second color sub-pixel 12 in the same pixel unit 10 with the first color sub-pixel 11 in the (N−1)-th frame to the predetermined input data of the first color sub-pixel 11 in the N-th frame. In Table 2, P1 to P7 are the input data values of the first color sub-pixel 11 in the current frame. D1 to D7 are the input data values of the second color sub-pixel 12 in the same pixel unit 10 with the first color sub-pixel 11 in the previous frame. q1 to q48 are the first impact factors. The sub-pixels of different colors may correspond to different second look-up tables. When the input data is the data corresponding to the red sub-pixel, the corresponding first impact factor may be looked up in the second look-up table corresponding to the red sub-pixel. When the input data is the data corresponding to the green sub-pixel, the corresponding first impact factor may be looked up in the second lookup table corresponding to the green sub-pixel. When the input data is the data corresponding to the blue sub-pixel, the corresponding first impact factor may be looked up in the second lookup table corresponding to the blue sub-pixel. In Table 2, the second lookup table only shows 8 input data values in the current frame and 6 input data values in the previous frame, which does not limit the actual number.

TABLE 2

| Second lookup table | | | | | | | | |
|---|---|---|---|---|---|---|---|---|
| | P1 | P2 | P3 | P4 | P5 | P6 | P7 | P8 |
| D1 | q1 | q2 | q3 | q4 | q5 | q6 | q7 | q8 |
| D2 | q9 | q10 | q11 | q12 | q13 | q14 | q15 | q16 |
| D3 | q17 | q18 | q19 | q20 | q21 | q22 | q23 | q24 |
| D4 | q25 | q26 | q27 | q28 | q29 | q30 | q31 | q32 |
| D5 | q33 | q34 | q35 | q36 | q37 | q38 | q39 | q40 |
| D6 | q41 | q42 | q43 | q44 | q45 | q46 | q47 | q48 |

In the display method of the display device of embodiments of the present disclosure, when the target input data of the first color sub-pixel 11 in the N-th frame is calculated, the impact of the input data of the first color sub-pixel 11 in the (N−1)-th frame to the predetermined input data of the first color sub-pixel 11 in the N-th frame may be considered, and the corresponding predetermined compensation value may be obtained from the first look-up table. The impact of the input data of the second color sub-pixel 12 in the same pixel unit 10 with the first color sub-pixel 11 to the predetermined input data of the first color sub-pixel 11 in the N-th frame may be considered, and the corresponding first impact factor may be obtained from the second lookup table. The actual compensation value of the first color sub-pixel 11 in the N-th frame may be calculated according to the predetermined compensation value and the first impact factor. The target input data of the first color sub-pixel 11 in the N-th frame may be calculated according to the actual compensation value and the predetermined input data of the first color sub-pixel 11 in the N-th frame. Thus, the first sub-pixel 11 may be displayed according to the target input data. Thus, when the target input data of the first color sub-pixel 11 in the N-th frame is calculated, not only the impact of the input data of the sub-pixel itself in the previous frame may be considered, but also the impact of another sub-pixel with a different color from the sub-pixel to the sub-pixel may be considered. Thus, the target input data obtained from the calculation may be more accurate, which may effectively improve the display smear problem and especially improve the smear problem caused by the lateral leakage of sub-pixels of different colors. Therefore, the display effect of the display device may be improved.

Figure 5:
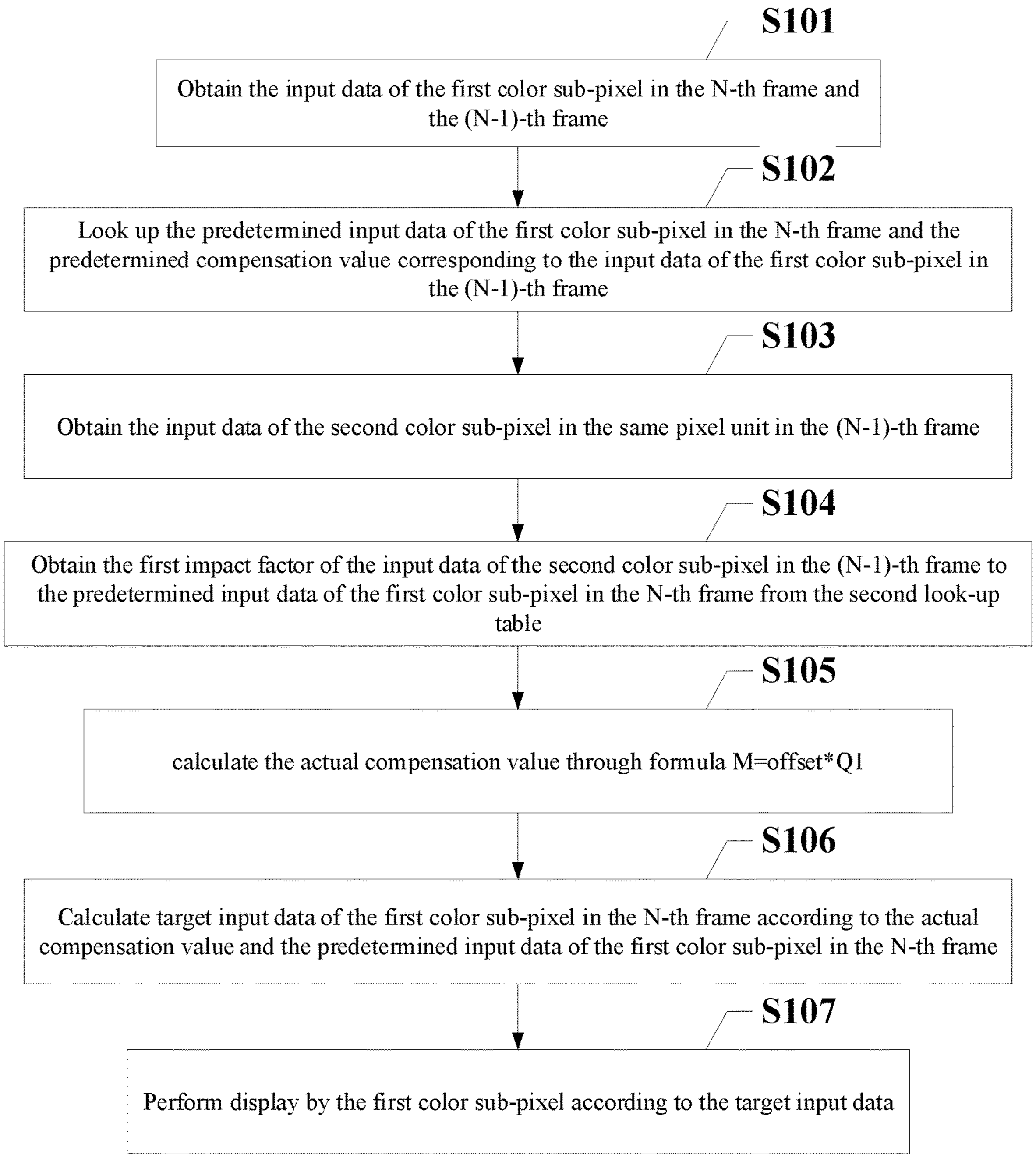
FIG. 5 is a schematic structural diagram of another display method of the display device according to some embodiments of the present disclosure.

FIG. 5 is a schematic structural diagram of another display method of the display device according to some embodiments of the present disclosure. In connection with FIG. 1 to FIG. 5, in some embodiments of the present disclosure, in process S105 of the display method shown in FIG. 1, calculating the actual compensation value at least according to the predetermined compensation value and the first impact factor includes M=offset*Q1, where M denotes the actual compensation value, offset denotes the predetermined compensation value, and Q1 denotes the first impact factor.

In some embodiments, when the actual compensation value of the first color sub-pixel 11 in the current frame is calculated, the predetermined input data of the first color sub-pixel 11 in the previous frame and the predetermined input data of the first color sub-pixel 11 in the current frame may be looked up according to the first lookup table, respectively. The first impact factor of the input data of the second color sub-pixel 12 in the same pixel unit 10 with the first color sub-pixel 11 in the previous frame to the predetermined input data of the first color sub-pixel 11 in the current frame may be looked up according to the second lookup table. The predetermined compensation value offset may be multiplied by the first impact factor Q1 to obtain the actual compensation value of the first color sub-pixel 11. This calculation method is simple and easy to implement. Moreover, by considering the impact of the input data of the first color sub-pixel 11 in the previous frame and the input data of the second color sub-pixel 12 in the same pixel unit 10 with the first color sub-pixel 11 to the first color sub-pixel 11 may be considered and the lateral leakage current in the same pixel unit 10 may be considered, the actual compensation value of the first color sub-pixel 11 calculated may be more accurate, which is more beneficial to improving the display abnormal phenomenon, such as smear.

In some embodiments of the present disclosure, the first impact factor Q1 may be greater than or equal to 0 and smaller than or equal to 2. In some embodiments, when the impact of the lateral leakage current of the second color sub-pixel 12 in the same pixel unit 10 in the previous frame to the input data of the first color sub-pixel 11 in the current frame is considered, the related first impact factor Q1 may be looked up through the second lookup table. Considering that the impact of the lateral leakage current on the input data in the current frame is within a controllable range, when the value of the first impact factor Q1 is set to be greater than 2, overcompensation may occur. Therefore, in the present disclosure, the first impact factor may be set to be less than or equal to 2 and may be adjusted flexibly within this range. Thus, the impact of the lateral leakage current in the previous frame to the sub-pixel of the current frame may be considered, and the overcompensation may be avoided, which is beneficial to improve the compensation accuracy to further improve the abnormal display problem such as smear.

In embodiments of the present disclosure, Referring still to Table 2, the second lookup table in the display method includes a number A of first impact factors, A=m*n, where m denotes a number of data_nodes corresponding to the input data of the second color sub-pixel 12 in the (N−1)-th frame in the second lookup table, n denotes a number of data_nodes corresponding to the input data of the first color sub-pixel 11 in the N-th frame. m is greater than 0 and smaller than or equal to 256, and n is greater than 0 and smaller than or equal to 256.

Considering that the sub-pixel may display any grayscale from 0 to 255 during the display process, when the number m of the data_nodes corresponding to the input data of the second color sub-pixel 12 in the (N−1)-th frame in the second lookup table is set to 256, 256 grayscales may be traversed from 0 to 255. When the number n of the data_nodes corresponding to the predetermined input data of the first color sub-pixel 11 in the N-th frame in the second lookup table is set to 256, 256 grayscales from 0 to 255. Thus, corresponding first impact factors may be looked up for different grayscale values, such that the obtained values of the first impact factors are more accurate. Considering that the greater the number of the data_nodes in the second lookup table is, the longer the search time will be, and the higher the memory requirement for the display device will be, when at least one of the number of data_nodes m and n is set to be less than 256, it is beneficial to reduce the number of data_nodes included in the second lookup table. Thus, it is beneficial to reduce the time required for looking up the first impact factor to a certain degree, which is beneficial to improving the drive efficiency of the display device to the sub-pixels.

In embodiments of the present disclosure, the number m of the data_nodes corresponding to the input data of the second color sub-pixel in the (N−1)-th frame in the second lookup table may be smaller than or equal to 10. The number n of the data_nodes corresponding to the predetermined input data of the first color sub-pixel in the N-th frame may be smaller than or equal to 10.

In some embodiments, in the second lookup table shown in Table 2, m=6 and n=8 are used as an example for description. In some other embodiments of the present disclosure, the values of m and n may also be selected to be other values less than or equal to 10, such as m=10, n=10, or m=8, n=5, or m=9, n=7, which are not limited in the present disclosure. When the number m of the data_nodes corresponding to the input data of the second color sub-pixel 12 in the (N−1)-th frame in the second lookup table and the number n of the data_nodes corresponding to the predetermined input data of the first color sub-pixel 11 in the N-th frame are set to be less than or equal to 10, the number of data stored in the second lookup table may be greatly reduced. Thus, an amount of memory occupied by the second lookup table may be effectively reduced, and the time required for looking up the first impact factor in the second lookup table may be effectively reduced. Therefore, the lookup efficiency of the first impact factor may be improved, and the drive efficiency of the display device may be improved while improving the smear problem.

In some embodiments, the data_nodes in the lookup table may not cover all grayscale values, for example, a number of the predetermined input data of the first color sub-pixel 11 in the N-th frame in the first lookup table and the second lookup table is not set to 256. In the lookup process through the lookup table, if the actual predetermined input data is not reflected in the data_nodes in the lookup table, a predetermined compensation value or impact factor corresponding to a non-data node may be calculated in a linear interpolation method. For the look-up table below, if a similar situation occurs, the corresponding impact factor or impact coefficient may also be calculated in the linear interpolation method. For the calculation method of the linear interpolation method, reference may be made to the method in the existing technology, which is not limited to the present disclosure.

In some embodiments of the present disclosure, Referring to FIG. 2, the pixel unit 10 further includes a third color sub-pixel 13. The look-up table further includes a third look-up table. The third look-up table includes a second impact factor of the input data of the third color sub-pixel 13 in the same pixel unit 10 in the (N−1)-th frame to the predetermined input data of the first color sub-pixel 11 in the N-th frame.

In process S105 of the display method in FIG. 1, calculating the actual compensation value at least according to the predetermined compensation value and the first impact factor includes M=offset*Q1*Q2, where M is the actual compensation value, and offset is the predetermined compensation value, Q1 is the first impact factor, and Q2 is the second impact factor.

Figure 6:
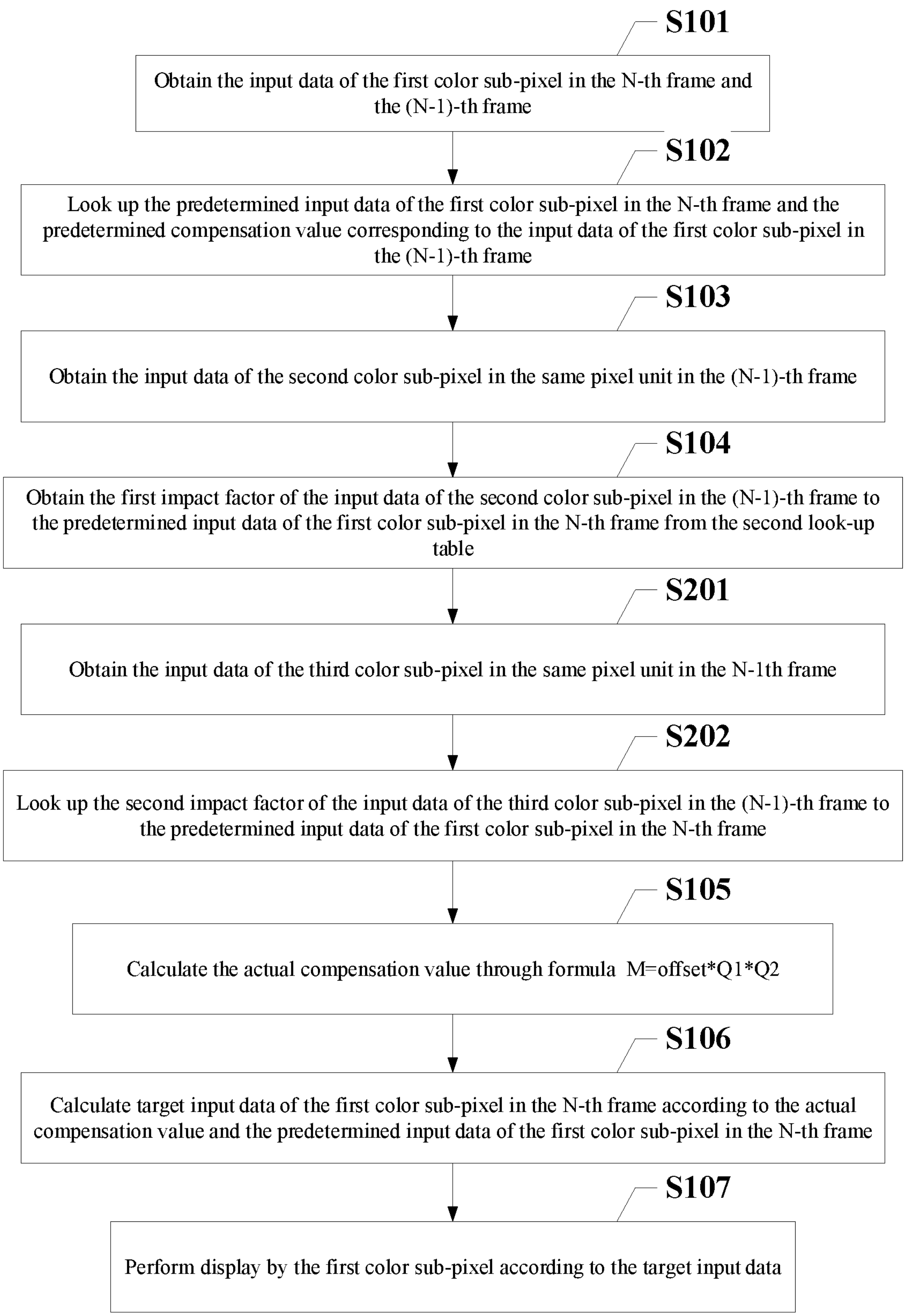
FIG. 6 is a schematic structural diagram of another display method of the display device according to some embodiments of the present disclosure.

In some embodiments, in connection with FIG. 2, when the same pixel unit 10 includes the sub-pixels of three colors, the first color sub-pixel 11 may also be affected by the lateral leakage current of the third color sub-pixel 13. FIG. 6 is a schematic structural diagram of another display method of the display device according to some embodiments of the present disclosure. In embodiments of the present disclosure, before process S105, the drive method of the display device further includes obtaining the input data of the third color sub-pixel 13 in the same pixel unit 10 in the (N−1)-th frame (S201) and looking up the second impact factor of the input data of the third color sub-pixel 13 in the (N−1)-th frame to the predetermined input data of the first color sub-pixel 11 in the N-th frame (S202).

In process S105, when the actual compensation value of the first color sub-pixel 11 in the current frame is calculated, the input data of the first color sub-pixel 11 in the previous frame, and the impact of the input data of the second color sub-pixel 12 and the third color sub-pixel 13 in the same pixel unit 10 with the first color sub-pixel 11 in the previous frame may be considered. That is, the actual compensation value may be calculated by considering the predetermined compensation value offset, the first impact factor Q1, and the second impact factor Q2. The multiplication of the predetermined compensation value offset, the first impact factor Q1, and the second impact factor Q2 may be used as the actual compensation value to cause the calculated actual compensation value to be more accurate. Thus, the smear problem caused by the lateral leakage current of the second color sub-pixel 12 and the third color sub-pixel 13 may be avoided, which is more beneficial to improving the display effect of the display device. In embodiments of the present disclosure, the impact of other sub-pixels of different colors in the same pixel unit on the current sub-pixel may be considered, which is more beneficial to improving the calculation accuracy of the actual compensation value of the current sub-pixel.

In some embodiments, a third lookup table includes the second impact factor Q2 of the input data of the third color sub-pixel 13 in the same pixel unit 10 with the first color sub-pixel 11 in the (N−1)-th frame to the predetermined input data of the first color sub-pixel 11 in the N-th frame. P1 to P8 in Table 3 are the input data values of the first color sub-pixel 11 in the current frame, E1 to E6 are the input data values of the third color sub-pixel 13 in the same pixel unit 10 with the first color sub-pixel 11 in the previous frame, and t1 to t48 are the second impact factors. The sub-pixels of different colors may correspond to different third look-up tables. When the input data is the data corresponding to the red sub-pixel, the corresponding second impact factor may be looked up in the third lookup table corresponding to the red sub-pixel. When the input data is the data corresponding to the green sub-pixel, the corresponding second impact factor may be looked up in the third lookup table corresponding to the green sub-pixel. When the input data is the data corresponding to the blue sub-pixel, the corresponding second impact factor may be looked up in the third table corresponding to the blue sub-pixel. In Table 3, the third lookup table only shows 8 input data values of the current frame and 6 input data values of the previous frame and does not limit the actual number.

TABLE 3

| Third Lookup Table | | | | | | | | |
|---|---|---|---|---|---|---|---|---|
| | P1 | P2 | P3 | P4 | P5 | P6 | P7 | P8 |
| E1 | t1 | t2 | t3 | t4 | t5 | t6 | t7 | t8 |
| E2 | t9 | t10 | t11 | t12 | t13 | t14 | t15 | t16 |
| E3 | t17 | t18 | t19 | t20 | t21 | t22 | t23 | t24 |
| E4 | t25 | t26 | t27 | t28 | t29 | t30 | t31 | t32 |
| E5 | t33 | t34 | t35 | t36 | t37 | t38 | t39 | t40 |
| E6 | t41 | t42 | t43 | t44 | t45 | t46 | t47 | t48 |

Referring to FIG. 2, in some embodiments of the present disclosure, the second impact factor Q2 is greater than or equal to 0 and smaller than or equal to 2. In some embodiments, when the impact of the lateral leakage current of the third color sub-pixel 13 in the same pixel unit 10 in the previous frame to the input data of the first color sub-pixel 11 in the current frame is considered, the corresponding second impact factor Q2 may be looked up in the second lookup table. Considering that the impact of the lateral leakage current is within a controllable range to the input data of the current frame, when the second impact factor Q2 is set to be greater than 2, overcompensation may occur. Therefore, in the present disclosure, the second impact factor may be set to be less than or equal to 2 and may be adjusted flexibly within this range. Thus, the impact of the lateral leakage current in the previous frame to the sub-pixels in the current frame may be considered, and the overcompensation may be avoided. Therefore, the compensation accuracy may be improved to further improve the abnormal display problem, such as smear.

In some embodiments of the present disclosure, referring still to Table 3, the third lookup table includes a number B of the second impact factors, B=p*q, where p denotes the number of the data_nodes corresponding to the input data of the third color sub-pixel 13 in the (N−1)-th frame in the third lookup table, and q denotes the number of the data_nodes corresponding to the predetermined input data of the first color sub-pixel 11 in the N-th frame. p and q are greater than 0 and smaller than or equal to 256.

Considering that the sub-pixel may display any grayscale from 0 to 255 during the display process, when the number p of the data_nodes corresponding to the input data of the third color sub-pixel 13 in the (N−1)-th frame in the third lookup table is set to 256, 256 grayscales from 0 to 255 may be traversed. Thus, for different grayscale values, the corresponding second impact factors may be looked up, such that the obtained values of the second impact factors may be more accurate. Considering that the greater the number of the data_nodes in the third lookup table is, the longer the time required for looking up is, and the higher the memory requirement for the display device is. When at least one of the numbers p and q of the data_nodes is set to be smaller than 256, it is beneficial to reduce the number of the data_nodes included in the third lookup table. Thus, the time required to look up the first impact factor may be reduced to a certain degree, and the drive efficiency of the display device to the sub-pixels may be improved.

In some embodiments of the present disclosure, the number p of the data_nodes corresponding to the input data of the third color sub-pixel in the (N−1)-th frame in the third lookup table may be smaller than or equal to 10, and the number q of the data_nodes corresponding to the predetermined input data of the first color sub-pixel 11 in the N-th frame may be smaller than or equal to 10.

In some embodiments, in the third lookup table shown in Table 3, p=6 and q=8 are used as an example for description. In some other embodiments of the present disclosure, the values of p and q may also be selected to be other values less than or equal to 10, such as p=10, q=10, or p=8, q=5, or, p=9, q=7, which are not limited in the present disclosure. When the number p of the data_nodes corresponding to the input data of the third color sub-pixel in the (N−1)-th frame and the number q of the data_nodes corresponding to the predetermined input data of the first color sub-pixel in the N-th frame in the third lookup table are set to be smaller than or equal to 10, the amount of data stored in the third lookup table may be greatly reduced, the amount of memory occupied by the third lookup table may be effectively reduced, and the time required by looking up the second impact factor in the third lookup table may be effectively reduced. Therefore, the lookup efficiency of the second impact factor may be improved, and the drive efficiency of the display device may be improved while the smear problem is improved.

In some embodiments of the present disclosure, the lookup table further includes a fourth lookup table. The fourth lookup table includes first impact coefficients of different display brightnesses to the first impact factors.

In some embodiments, referring to Table 4, the fourth lookup table includes the first impact coefficient of the display brightness to the first impact factor. DBV1 to DBV10 in Table 4 represent different display brightnesses, q1 to q3 represent different first impact factors, and g1 to g30 represent the impact coefficients of different display brightnesses to the different first impact factors. In Table 4, the fourth lookup table only shows the first impact coefficients of 10 display brightnesses to different first impact factors and does not limit the actual number.

TABLE 4

| Fourth lookup table | | | | | | | | | | |
|---|---|---|---|---|---|---|---|---|---|---|
| | DBV1 | DBV2 | DBV3 | DBV4 | DBV5 | DBV6 | DBV7 | DBV8 | DBV9 | DBV10 |
| q1 | g1 | g2 | g3 | g4 | g5 | g6 | g7 | g8 | g9 | g10 |
| q2 | g11 | g12 | g13 | g14 | g15 | g16 | g17 | g18 | g19 | g20 |
| q3 | g21 | g22 | g23 | g24 | g25 | g26 | g27 | g28 | g29 | g30 |
| . . . | . . . | . . . | . . . | . . . | . . . | . . . | . . . | . . . | . . . | . . . |

In process S105 of the display method in FIG. 1, calculating the actual compensation value at least according to the predetermined compensation value and the first impact factor includes M=offset*Q1*G1, where M represents the actual compensation value, and offset represents the predetermined compensation value, Q1 represents the first impact factor, and G1 represents the first impact coefficient.

In the display method of the display device of embodiments of the present disclosure, when the actual compensation value of the first color sub-pixel in the current frame is calculated, the input data of the first color sub-pixel in the previous frame, and the impact of the input data of the second color sub-pixel in the same pixel unit with the first color sub-pixel in the previous frame may be considered. That is, the predetermined compensation value and the first impact factor may be considered to avoid the impact of the lateral leakage current on the input data in the current frame to improve the smear problem and improve the display effect. Under different display brightnesses, the first impact factor may have different values. If the same first impact factor is used to calculate the actual compensation value under different display brightnesses, the calculated actual compensation value may have a certain deviation. Thus, a fourth lookup table may be provided in embodiments of the present disclosure. The first impact coefficient of different display brightnesses to the first impact factor may be considered to improve the calculation accuracy of the actual compensation value.

Figure 7:
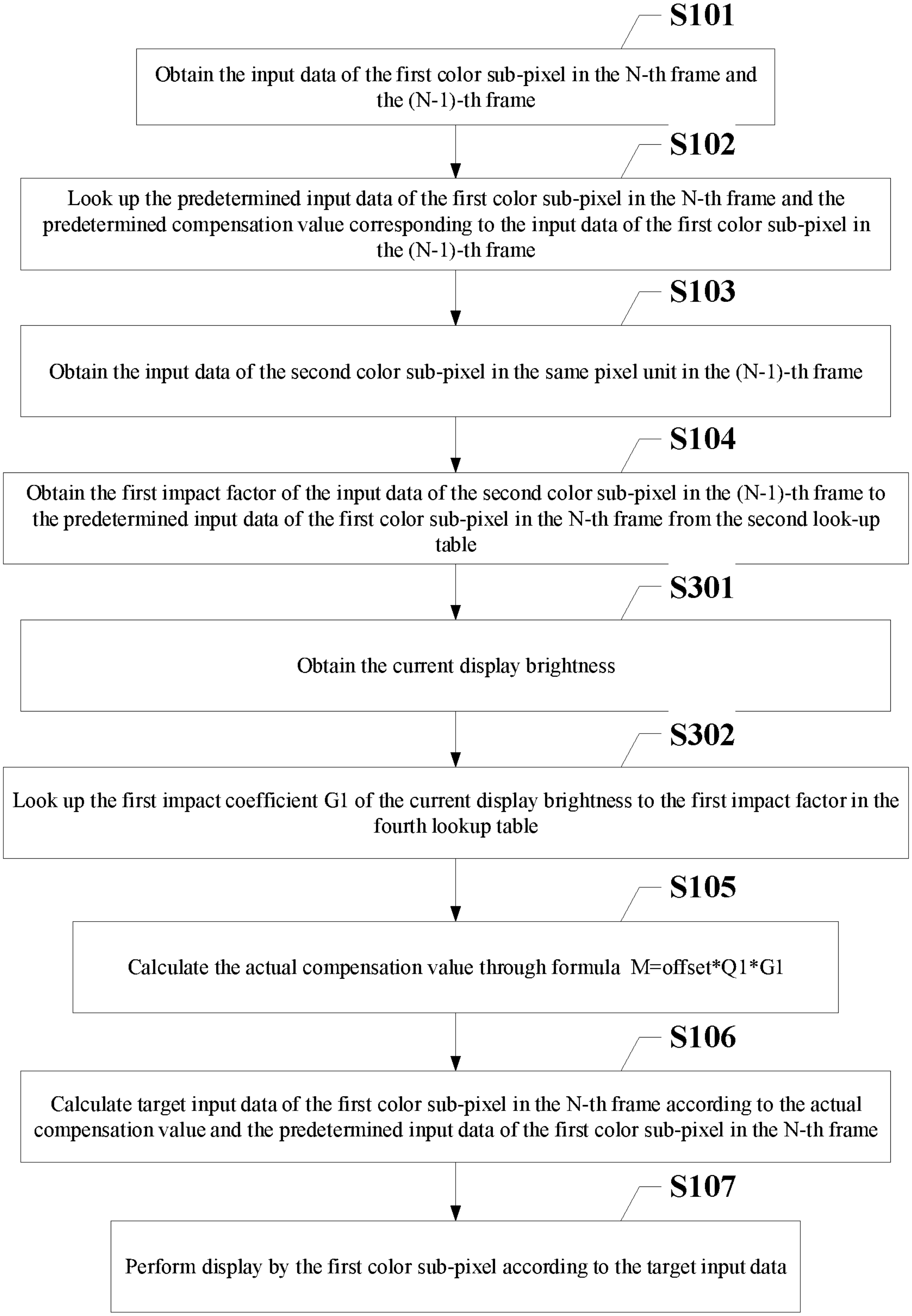
FIG. 7 is a schematic structural diagram of another display method of the display device according to some embodiments of the present disclosure.

In some embodiments, FIG. 7 is a schematic structural diagram of another display method of the display device according to some embodiments of the present disclosure. In the drive method of the display device of embodiments of the present disclosure, before process S105, the method includes obtaining the current display brightness (S301) and looking up the first impact coefficient G1 of the current display brightness to the first impact factor in the fourth lookup table (S302).

In process S105, when the actual compensation value is calculated, the predetermined compensation value offset, the first impact factor Q1, and the first impact coefficient G1 of the current display brightness to the first impact factor may be considered. When the product thereof is used as the actual compensation value, the obtained actual compensation value may be more accurate.

In embodiments of the present disclosure, the fourth lookup table includes a plurality of display brightness data_nodes. The actual brightness values corresponding to the display brightness data_nodes may be less than or equal to 2 nit.

In some embodiments, Table 4 shows 10 display brightness data_nodes, i.e., DBV1 to DBV10. In embodiments of the present disclosure, when the display brightness data_nodes are selected in the fourth lookup table, a brightness value whose actual brightness value is less than or equal to 2 nit may be selected. Considering that the display brightness has the most obvious impact on the first impact factor when the display brightness is less than or equal to 2 nit. Thus, when the display brightness value with the actual brightness value less than or equal to 2 nit is selected in the fourth lookup table, the first impact factor may be compensated or adjusted more accurately to improve the calculation accuracy of the actual compensation value.

In embodiments of the present disclosure, the lookup table may further include a fifth lookup table. The fifth lookup table may include second impact coefficients of different display brightnesses to the first impact factor and the second impact factor.

In process S105 of the display method in FIG. 1, calculating the actual compensation value at least according to the predetermined compensation value and the first impact factor includes M=offset*Q1*Q2*G2, where M represents the actual compensation value, and offset represents the predetermined compensation value, Q1 represents the first impact factor, Q2 represents the second impact factor, and G2 represents the second impact factor.

In the display method of the display device of embodiments of the present disclosure in FIG. 7, when the actual compensation value of the first color sub-pixel in the current frame is calculated, the predetermined compensation value corresponding to the input data of the first color sub-pixel in the previous frame, the first impact factor corresponding to the input data of the second color sub-pixel in the same pixel unit with the first color sub-pixel in the previous frame, and the first impact coefficient of the display brightness to the first impact factor may be considered. Thus, the compensation for the impact of the lateral leakage current on the input data in the current frame may be more accurate. When the second impact factor corresponding to the input data of the third color sub-pixel in the same pixel unit with the first color sub-pixel in the previous frame is considered, different display brightnesses may also impact the second impact factor. Therefore, a fifth look-up table may be provided in embodiments of the present disclosure. With the second impact coefficients of different display brightnesses to the second impact factors, the calculation accuracy of the actual compensation value may be further improved.

Figure 8:
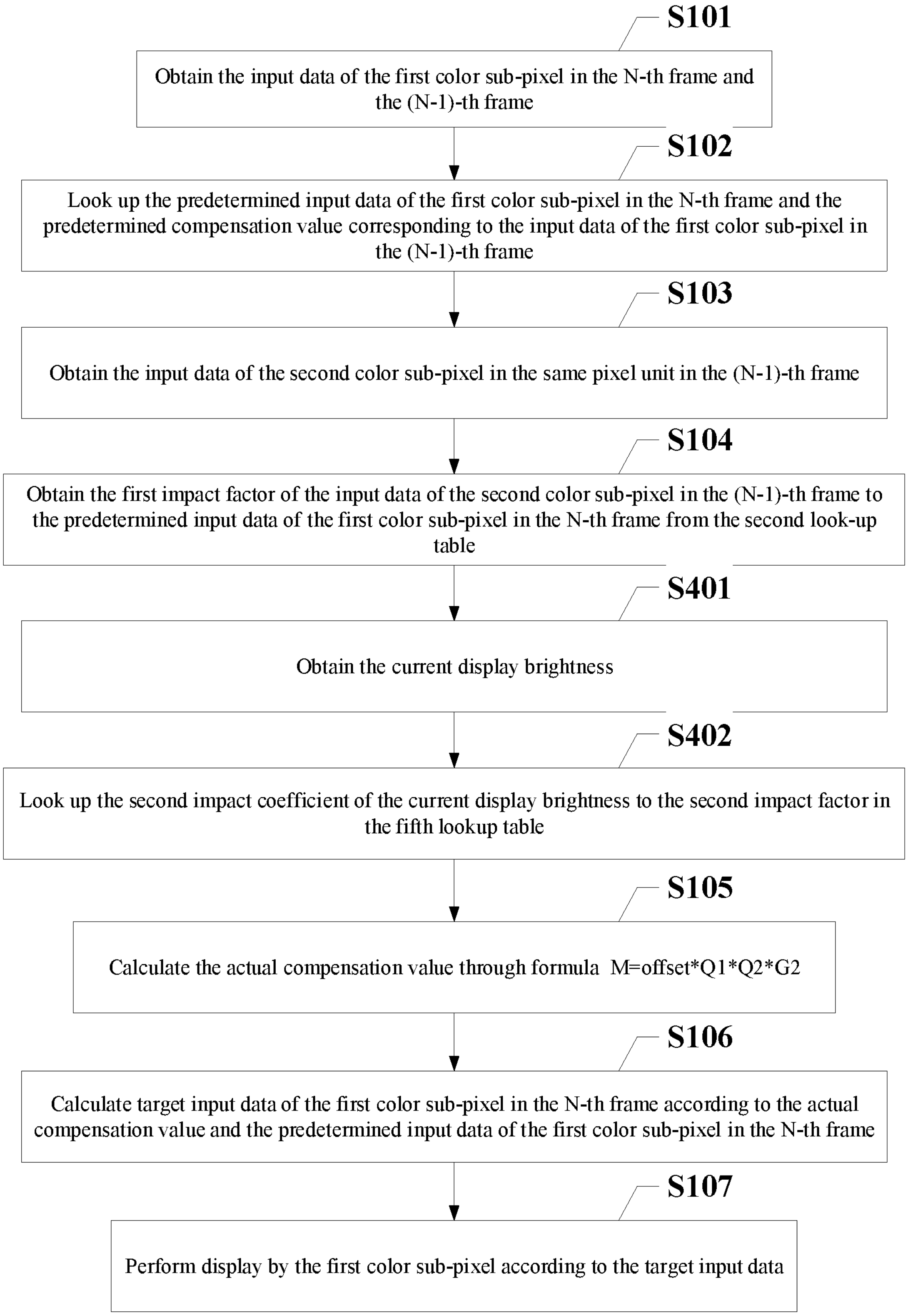
FIG. 8 is a schematic structural diagram of another display method of the display device according to some embodiments of the present disclosure.

In some embodiments, FIG. 8 is a schematic structural diagram of another display method of the display device according to some embodiments of the present disclosure. In the drive method of the display device of embodiments of the present disclosure, before process S105, the method includes obtaining the current display brightness (S401) and looking up the second impact coefficient of the current display brightness to the second impact factor in the fifth lookup table (S402).

In some embodiments, referring to Table 5, the fifth lookup table includes a second impact coefficient of the display brightness to the second impact factor. In Table 5, DBV1 to DBV10 represent different display brightnesses, t1 to t3 represent different second impact factors, and a1 to a30 represent the impact coefficients of the different display brightnesses to the different second impact factors. In Table 5, the fifth lookup table only shows the second impact coefficients of 10 display brightnesses to the different second impact factors and does not limit the actual number.

TABLE 5

| Fifth lookup table | | | | | | | | | | |
|---|---|---|---|---|---|---|---|---|---|---|
| | DBV1 | DBV2 | DBV3 | DBV4 | DBV5 | DBV6 | DBV7 | DBV8 | DBV9 | DBV10 |
| t1 | a1 | a2 | a3 | a4 | a5 | a6 | a7 | a8 | a9 | a10 |
| t2 | a11 | a12 | a13 | a14 | a15 | a16 | a17 | a18 | a19 | a20 |
| t3 | a21 | a22 | a23 | a24 | a25 | a26 | a27 | a28 | a29 | a30 |
| ... | ... | ... | ... | ... | ... | ... | ... | ... | ... | ... |

In process S105, when the actual compensation value is calculated, the predetermined compensation value offset, the first impact factor Q1, the second impact factor Q2, and the second impact coefficient G2 of the current display brightness to the second impact factor may be considered. When the product thereof is used as the actual compensation value, the actual compensation value obtained may be more accurate. In order to make the calculated actual compensation value more accurate, based on embodiments of the present disclosure, the first impact coefficient G1 of the current display brightness to the first impact factor may be further considered. After the current display brightness is obtained, the first impact coefficient and the second impact coefficient of the current brightness to the first impact factor and the second impact factor may be looked up in the fourth lookup table and the fifth lookup table. Then, the actual compensation value may be calculated by M=offset*Q1*Q2*G1*G2. Therefore, the factors considered in the calculation process of the actual compensation value may be more comprehensive, and the calculation result may be more accurate.

In embodiments of the present disclosure, the lookup table may further include a sixth lookup table. The sixth lookup table may include third impact coefficients of different refresh frequencies to the first impact factor.

In process S105 of the display method in FIG. 1, calculating the actual compensation value at least according to the predetermined compensation value and the first impact factor includes M=offset*Q1*G3, where M represents the actual compensation value, and offset represents the predetermined compensation value, Q1 represents the first impact factor, and G3 represents the third impact coefficient.

Figure 9:
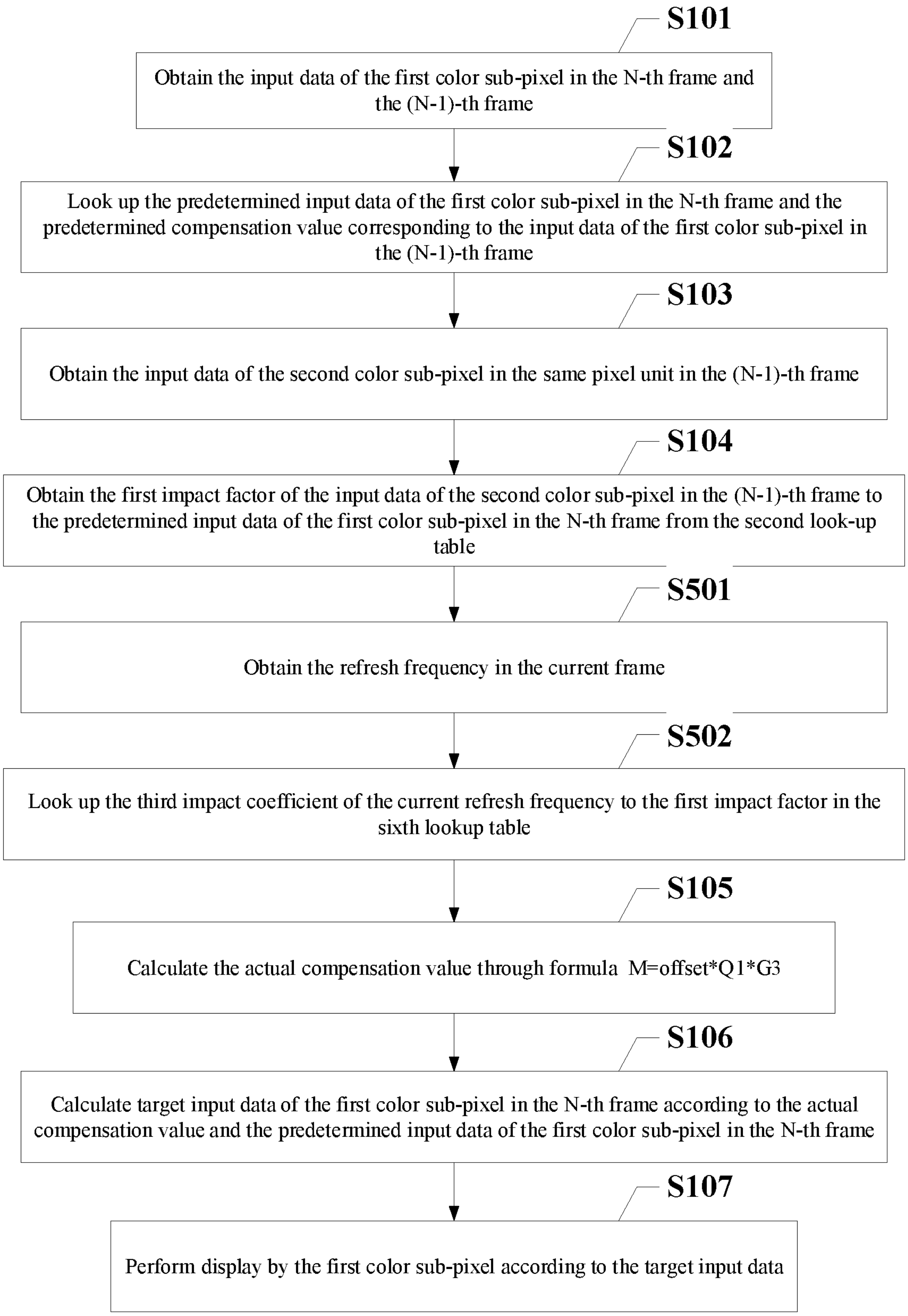
FIG. 9 is a schematic structural diagram of another display method of the display device according to some embodiments of the present disclosure.

For example, FIG. 9 is a schematic structural diagram of another display method of the display device according to some embodiments of the present disclosure. Before process 105, the method further includes obtaining the refresh frequency in the current frame (S501) and looking up the third impact coefficient of the current refresh frequency to the first impact factor in the sixth lookup table (S502).

When the actual compensation value of the first color sub-pixel 11 in the current frame is calculated, in embodiments of the present disclosure, the predetermined compensation value of the input data of the first color sub-pixel in the previous frame to the input data in the current frame and the first impact factor of the input data of the second color sub-pixel 12 in the same pixel unit with the first color sub-pixel 11 may be considered, which may improve the tailing phenomenon due to the lateral leakage current at a certain degree. However, in different refresh frequencies, the value of the first impact factor may be different. That is, the value of the first impact factor may be affected by the refresh frequency. Therefore, embodiments of the present disclosure provide the sixth lookup table. When the actual compensation value is calculated, the third impact coefficient of the refresh frequency to the first impact factor may be considered. The product of the predetermined compensation value, the first impact factor, and the third impact factor may be used as the actual compensation value, which avoids the problem that the actual compensation value has a large error caused by different refresh frequencies. Therefore, it is more beneficial to improve the calculation accuracy of the actual compensation value.

In some embodiments, referring to table 6, a sixth lookup table includes the third impact coefficient of the refresh frequency to the first impact factor. In table 6, Freq1 to Freq10 represent different refresh frequencies, q1 to q3 represent different first impact factors, and b1 to b30 represent the third impact coefficients of different refresh frequencies to different first impact factors. In Table 6, the sixth look-up table only shows the third impact coefficients of 10 refresh frequencies to different first impact factors and does not limit the actual number.

TABLE 6

| Sixth Lookup Table | | | | | | | | | | |
|---|---|---|---|---|---|---|---|---|---|---|
| | Freq1 | Freq2 | Freq3 | Freq4 | Freq5 | Freq6 | Freq7 | Freq8 | Freq9 | Freq10 |
| q1 | b1 | b2 | b3 | b4 | b5 | b6 | b7 | b8 | b9 | b10 |
| q2 | b11 | b12 | b13 | b14 | b15 | b16 | b17 | b18 | b19 | b20 |
| q3 | b21 | b22 | b23 | b24 | b25 | b26 | b27 | b28 | b29 | b30 |
| . . . | . . . | . . . | . . . | . . . | . . . | . . . | . . . | . . . | . . . | . . . |

In embodiments of the present disclosure, the lookup table may further include a seventh lookup table. The seventh lookup table may include fourth impact coefficients of different refresh frequencies to the first impact factor and the second impact factor In process S105 of the display method in FIG. 1, calculating the actual compensation value at least according to the preset compensation value and the first impact factor includes M=offset*Q1*Q2*G4, where M represents the actual compensation value, offset represents the predetermined compensation value, Q1 represents the first impact factor, Q2 represents the second impact factor, and G4 represents the fourth impact coefficient.

Figure 10:
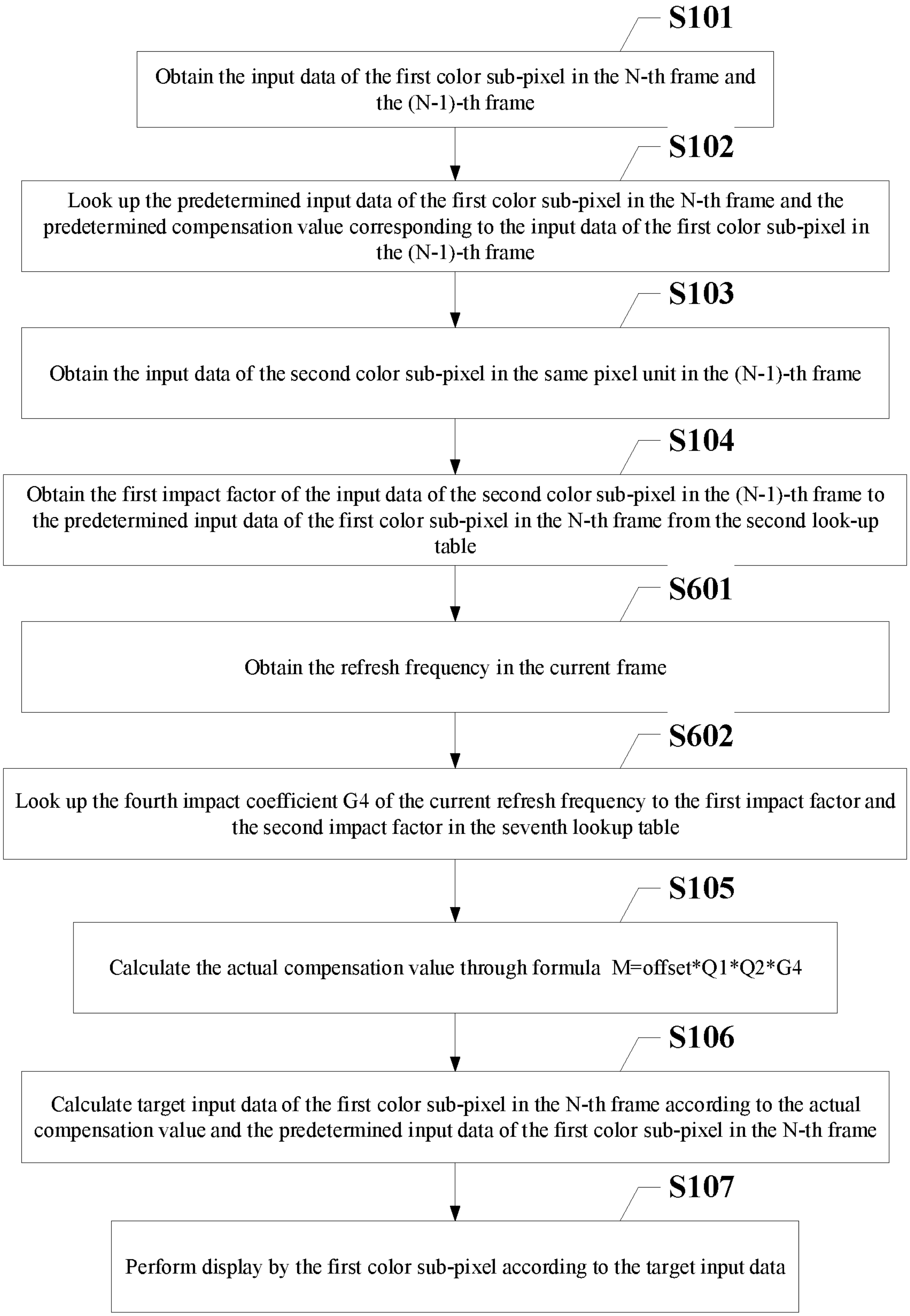
FIG. 10 is a schematic structural diagram of another display method of the display device according to some embodiments of the present disclosure.

For example, FIG. 10 is a schematic structural diagram of another display method of the display device according to some embodiments of the present disclosure. Before process S105, the method further includes obtaining the refresh frequency in the current frame (S601) and looking up the fourth impact coefficient G4 of the current refresh frequency to the first impact factor and the second impact factor in the seventh lookup table (S602).

When the actual compensation value of the first color sub-pixel in the current frame is calculated, the predetermined compensation value of the input data of the first color sub-pixel 11 in the previous frame to the input data in the current frame and the first impact factor and the second impact factor of the input data of the second color sub-pixel and the third color sub-pixel in the same pixel unit with the first color sub-pixel to the first color sub-pixel may be considered. Thus, the smear phenomenon caused by the lateral leakage current may be improved to a certain degree. However, in different refresh frequencies, the values of the first impact factor and the second impact factor may be different. That is, the values of the first impact factor and the second impact factor may be affected by the refresh frequencies. Therefore, embodiments of the present disclosure provide the seventh look-up table. When the actual compensation value is calculated, the fourth impact coefficient of the refresh frequency to the first impact factor and the second impact factor may be considered. The product of the predetermined compensation value, the first impact factor, the second impact factor, and the fourth impact coefficient may be used as the actual compensation value, which avoids the problem that the actual compensation value has a large error caused by different refresh frequencies.

In some embodiments, referring to table 7, a seventh lookup table includes the fourth impact coefficients of the refresh frequencies to the first impact factor and the second impact factor. In table 7, Freq1 to Freq10 represent different refresh frequencies, Q1/Q2 represent the first impact factor and the second impact factor, and c1 to c10 represent the fourth impact coefficients of the different refresh frequencies to the first impact factor and the second impact factor. In Table 7, the seventh lookup table only shows the fourth impact coefficients of 10 refresh frequencies to the first impact factor and the second impact factor and does not limit the actual number. In table 7, the impact of the different refresh frequencies on the first impact factor Q1 and the second impact factor Q2 is comprehensively considered. Thus, different lookup tables may not need to be set for the first impact factor Q1 and the second impact factor Q2, respectively. Therefore, it is beneficial to reduce the number of lookup tables stored in the memory 50 and improve the lookup efficiency of the fourth impact coefficients.

TABLE 7

| Seventh Lookup Table | | | | | | | | | | |
|---|---|---|---|---|---|---|---|---|---|---|
| | Freq1 | Freq2 | Freq3 | Freq4 | Freq5 | Freq6 | Freq7 | Freq8 | Freq9 | Freq10 |
| Q1/Q2 | c1 | c2 | c3 | c4 | c5 | c6 | c7 | c8 | c9 | c10 |

In embodiments of the present disclosure, the lookup table may further include an eighth lookup table. The eighth lookup table may include fifth impact coefficients of different display brightnesses and refresh frequencies to the first impact factor.

In process S105 of the display method in FIG. 1, calculating the actual compensation value at least according to the predetermined compensation value and the first impact factor includes M=offset*Q1*G5, where M represents the actual compensation value, and offset represents the predetermined compensation value, Q1 represents the first impact factor, and G5 represents the fifth impact coefficient.

Figure 11:
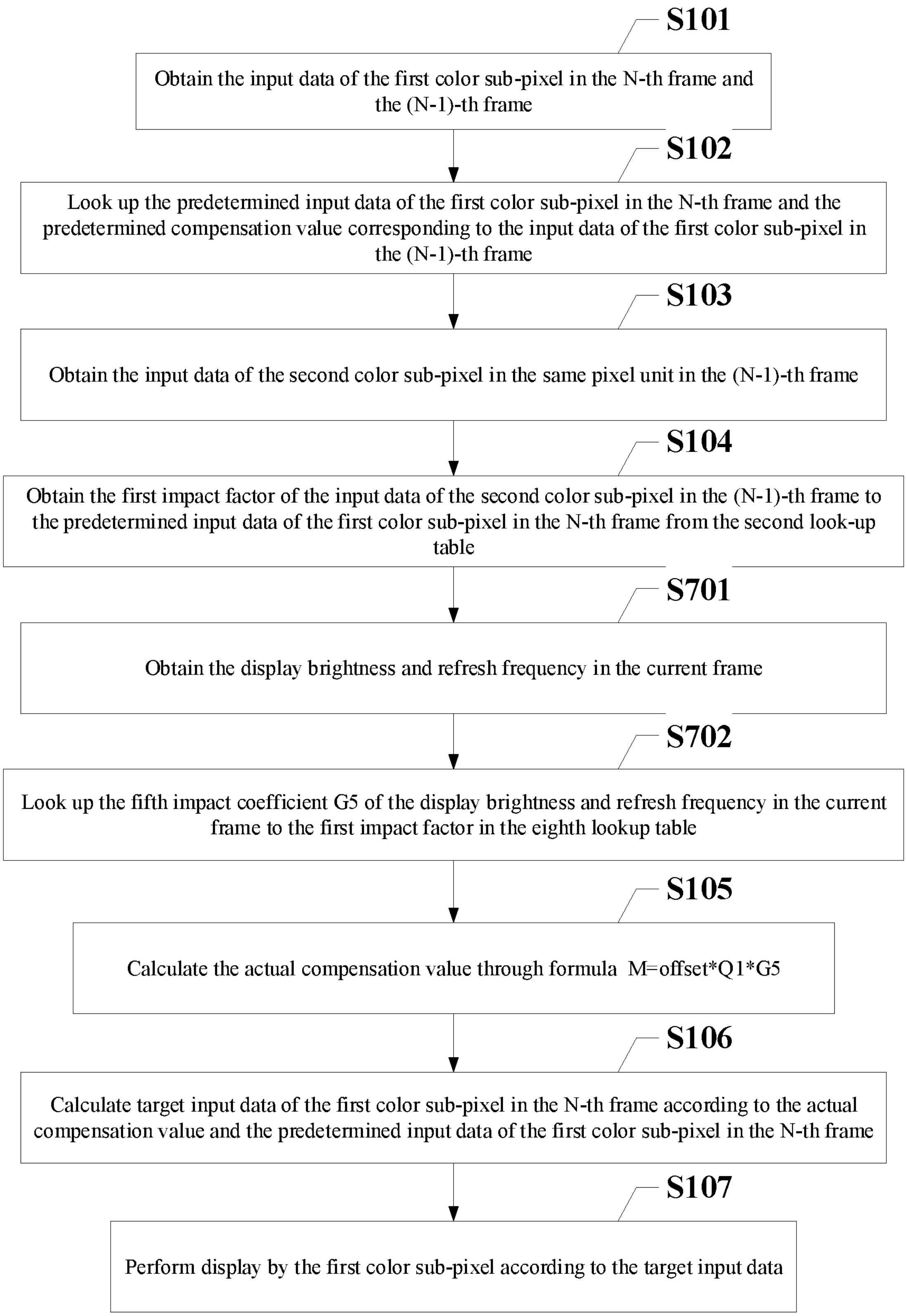
FIG. 11 is a schematic structural diagram of another display method of the display device according to some embodiments of the present disclosure.

For example, FIG. 11 is a schematic structural diagram of another display method of the display device according to some embodiments of the present disclosure. Before process S105, the method further includes obtaining the display brightness and refresh frequency in the current frame (S701) and looking up the fifth impact coefficient G5 of the display brightness and refresh frequency in the current frame to the first impact factor in the eighth lookup table (S702).

When the actual compensation value of the first color sub-pixel in the current frame is calculated, in embodiments of the present disclosure, the predetermined compensation value of the input data of the first color sub-pixel in the previous frame to the input data in the current frame and the first impact factor of the input data of the second color sub-pixel in the same pixel unit with the first color sub-pixel to the first color sub-pixel may be considered. As such, the smear phenomenon caused by the lateral leakage current can be improved to a certain degree. However, in different refresh frequencies or display brightnesses, the value of the first impact factor may be different. That is, the value of the first impact factor may be affected by the display brightness and the refresh frequency. Therefore, embodiments of the present disclosure provide the eighth look-up table. When the actual compensation value is calculated, the fifth impact coefficient of the display brightness and the refresh frequency to the first impact factor may be considered. The product of the predetermined compensation value, the first impact factor, and the fifth impact coefficient may be used as the actual compensation value, which avoids the problem that the actual compensation value has a large error caused by different display brightnesses or refresh frequencies.

In some embodiments, referring to table 8, an eighth lookup table includes the fifth impact coefficients of the display brightnesses and refresh frequencies to the first impact factor. In table 8, DBVn/Freqn represent different display brightnesses and refresh frequencies, respectively, Q1 represents the first impact factor, and fn represents the fifth impact coefficient of the display brightness and refresh frequency to the first impact factor. In the eighth lookup table shown in table 8, the fifth impact coefficients of the display brightnesses and refresh frequencies to the first impact factor are integrated into one lookup table. Thus, different lookup tables may not need to be set for the display brightness and the refresh frequency, respectively, which is beneficial to reduce the number of lookup tables stored in the memory and improve the lookup efficiency of the fifth impact coefficient.

TABLE 8

| Eighth Lookup Table | | | | | |
|---|---|---|---|---|---|
| | DBV1/Freq1 | DBV2/Freq2 | DBV3/Freq3 | . . . | DBVn/Freqn |
| Q1 | f1 | f2 | f3 | . . . | fn |

In embodiments of the present disclosure, the fifth impact coefficient may be greater than or equal to 0 and smaller than or equal to 16.

In some embodiments, the fifth impact coefficient represents an impact factor of the display brightness and refresh frequency in the current frame to the first impact factor. Considering that the impact of the display brightness and the refresh frequency to the first impact factor is within a controllable range, when the value of the fifth impact coefficient is set to be greater than 16, overcompensation may occur. Therefore, in the present disclosure, the fifth impact factor may be set to be less than or equal to 16 and may be adjusted flexibly within this range, which may not only consider the impact of the display brightness and the refresh frequency to the first impact factor, but also avoid the overcompensation. Therefore, it is beneficial to improve the compensation accuracy to further improve the abnormal display problem, such as smear.

In embodiments of the present disclosure, the lookup table may further include a ninth lookup table. The ninth lookup table may include sixth impact coefficients of different display brightnesses and refresh frequencies to the first impact factor and the second impact factor.

In process S105 of the display method in FIG. 1, calculating the actual compensation value at least according to the predetermined compensation value and the first impact factor includes M=offset*Q1*Q2*G6, where M represents the actual compensation value, and offset represents the predetermined compensation value, Q1 represents the first impact factor, Q2 represents the second impact factor, and G6 represents the sixth impact coefficient.

Figure 12:
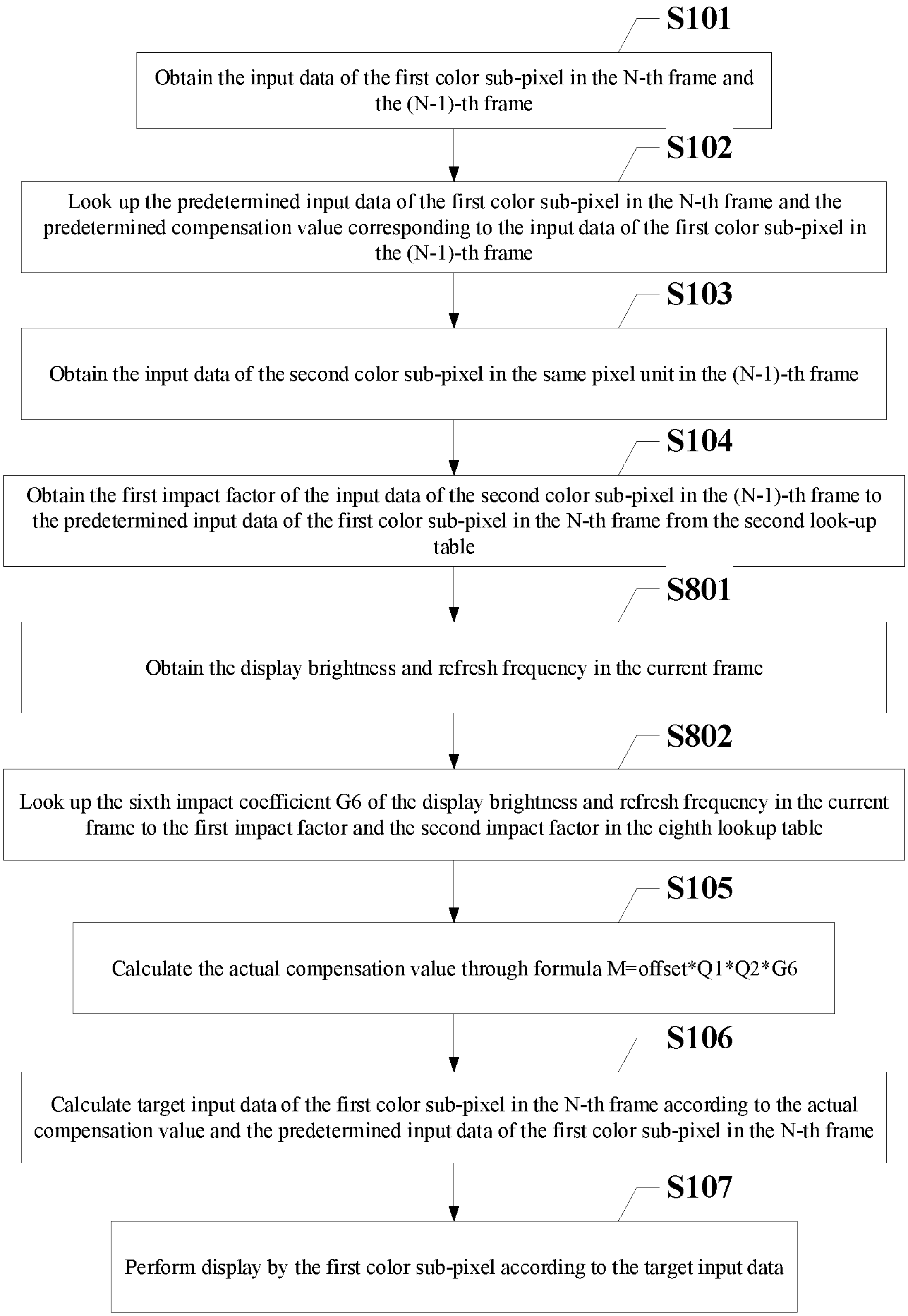
FIG. 12 is a schematic structural diagram of another display method of the display device according to some embodiments of the present disclosure.

For example, FIG. 12 is a schematic structural diagram of another display method of the display device according to some embodiments of the present disclosure. Before process S105, the method further includes obtaining the display brightness and refresh frequency in the current frame (S801) and looking up the sixth impact coefficient G6 of the display brightness and refresh frequency in the current frame to the first impact factor and the second impact factor in the eighth lookup table (S802).

When the actual compensation value of the first color sub-pixel in the current frame is calculated, in embodiments of the present disclosure, the predetermined compensation value of the input data of the first color sub-pixel in the previous frame to the input data in the current frame and the first impact factor of the input data of the second color sub-pixel and the third color sub-pixel in the same pixel unit with the first color sub-pixel to the first color sub-pixel may be considered. Thus, the smear phenomenon caused by the lateral leakage current may be improved to a certain degree. However, in different refresh frequencies or display brightnesses, the values of the first impact factor and the second impact factor may be different. That is, the values of the first impact factor and the second impact factor may be affected by the display brightness and the refresh frequency. Therefore, embodiments of the present disclosure provide the ninth lookup table. When the actual compensation value is calculated, the sixth impact coefficient of the display brightness and refresh frequency to the first impact factor and the second impact factor may be considered. The product of the predetermined compensation value, the first impact factor, the second impact factor, and the sixth impact coefficient may be used as the actual compensation value, which avoids the problem that the actual compensation value has a large error caused by the different display brightnesses or refresh frequencies. Thus, the calculation accuracy of the actual compensation value may be further improved.

In some embodiments, referring to table 9, a ninth lookup table includes sixth impact coefficients of display brightnesses and refresh frequencies on the first impact factor and the second impact factor. In table 9, DBVn/Freqn represent different display brightnesses and refresh frequencies, respectively, Q1 represents the first impact factor, Q2 represents the second impact factor, and jn represents the sixth impact coefficient of display brightness and the refresh frequency to the first impact factor and the second impact factor. In the ninth lookup table shown in Table 9, the sixth impact coefficient of the display brightness and refresh frequency to the first impact factor and the second impact factor is integrated into one lookup table. Different lookup tables may not need to be set for the display brightness and refresh frequency, respectively, and different lookup tables may also not be set for the first impact factor and the second impact factor, respectively. Thus, the calculation accuracy of the actual compensation value may be improved, while the number of the lookup tables stored in the memory may be reduced, and the lookup efficiency of the sixth impact coefficient may be improved.

TABLE 9

| Ninth Lookup Table | | | | | |
|---|---|---|---|---|---|
| | DBV1/Freq1 | DBV2/Freq2 | DBV3/Freq3 | . . . | DBVn/Freqn |
| Q1/Q2 | j1 | j2 | j3 | . . . | jn |

In embodiments of the present disclosure, the sixth impact coefficient may be greater than or equal to 0 and smaller than or equal to 16.

In some embodiments, the sixth impact factor represents the impact coefficient of the display brightness and refresh frequency in the current frame to the first impact factor and the second impact factor. Considering that the impact of the display brightness and refresh frequency to the first impact factor and the second impact factor is within a controllable range, when the value of the sixth impact coefficient is set to be greater than 16, overcompensation may occur. Therefore, in the present disclosure, the sixth impact factor may be set to be less than or equal to 16 and may be adjusted flexibly within this range, and the overcompensation may be avoided. Thus, it is beneficial to improve the compensation accuracy to further improve the abnormal display problem, such as smear.

In summary, the display method of the display device of the present disclosure achieves at least the following beneficial effects.

In the display method of the display device of the present disclosure, the display device may include the first color sub-pixel and the second color sub-pixel. The first lookup table and the second lookup table may be stored in the memory. The first lookup table may include the predetermined compensation value corresponding to the predetermined input data of the first color sub-pixel in the N-th frame and the input data in the (N−1)-th frame. The second lookup table may include the first impact factor of the input data of the second color sub-pixel in the same pixel unit with the first color sub-pixel in the (N−1)-th frame to the predetermined input data of the first color sub-pixel in the N-th frame. In the display method, when the target input data of the first color sub-pixel in the N-th frame is calculated, the impact of the input data of the first color sub-pixel in the (N−1)-th frame on the predetermined input data of the first color sub-pixel in the N-th frame may be considered, and the corresponding predetermined compensation value may be obtained from the first lookup table. Moreover, the impact of the input data of the second color sub-pixel in the same pixel unit with the first color sub-pixel in the (N−1)-th frame on the predetermined input data of the first color sub-pixel in the N-th frame may be considered, and the corresponding first impact factor may be obtained from the second lookup table. The actual compensation value of the first color sub-pixel in the N-th frame may be calculated according to the predetermined compensation value and the first impact factor. The target input data of the first color sub-pixel in the N-th frame may be calculated according to the actual compensation value and the predetermined input data of the first color sub-pixel in the N-th frame. Thus, the first color sub-pixel may display according to the target input data. Therefore, when the target input data of the first color sub-pixel in the N-th frame is calculated, the impact of the input data of the sub-pixel in the previous frame may be considered, and the impact of another sub-pixel different from the sub-pixel to the sub-pixel may be considered. As such, the calculated target input data may be more accurate, the problem of display smear may be effectively improved. In particular, the smear problem caused by the lateral leakage current of the different color sub-pixels may be improved, which improves the display effect of the display device.

Compared with the existing technology, the display method of the display device of the present disclosure achieves at least the following beneficial effects.

For example, the disclosed display device may include the first color sub-pixel and the second color sub-pixel. The first lookup table and the second lookup table may be stored in the memory. The first lookup table may include the predetermined compensation value corresponding to the predetermined input data of the first color sub-pixel in the N-th frame and the input data in the (N−1)-th frame. The second lookup table may include the first impact factor of the input data of the second color sub-pixel in the same pixel unit with the first color sub-pixel in the (N−1)-th frame to the predetermined input data of the first color sub-pixel in the N-th frame. In the display method, when the target input data of the first color sub-pixel in the N-th frame is calculated, the impact of the input data of the first color sub-pixel in the (N−1)-th frame on the predetermined input data of the first color sub-pixel in the N-th frame may be considered, and the corresponding predetermined compensation value may be obtained from the first lookup table. Moreover, the impact of the input data of the second color sub-pixel in the same pixel unit with the first color sub-pixel in the (N−1)-th frame on the predetermined input data of the first color sub-pixel in the N-th frame may be considered, and the corresponding first impact factor may be obtained from the second lookup table. The actual compensation value of the first color sub-pixel in the N-th frame may be calculated according to the predetermined compensation value and the first impact factor. The target input data of the first color sub-pixel in the N-th frame may be calculated according to the actual compensation value and the predetermined input data of the first color sub-pixel in the N-th frame. Thus, the first color sub-pixel may display according to the target input data. Therefore, when the target input data of the first color sub-pixel in the N-th frame is calculated, the impact of the input data of the sub-pixel in the previous frame may be considered, and the impact of another sub-pixel different from the sub-pixel to the sub-pixel may be considered. As such, the calculated target input data may be more accurate, and the problem of display smear may be effectively improved. In particular, the smear problem caused by the lateral leakage current of the different color sub-pixels may be improved, which improves the display effect of the display device.

Although some embodiments of the present disclosure have been described through the examples, those skilled in the art should understand that the above examples are provided for illustration only and not for the purpose of limiting the scope of the present disclosure. Those skilled in the art should understand that modifications may be made to embodiments of the present disclosure without departing from the scope and spirit of the present disclosure. The scope of the present application is defined by the appended claims.

What is claimed is:

1. A display method of a display device, wherein the display device comprises:

- a plurality of pixel units, one pixel unit of the plurality of pixel units including a first color sub-pixel and a second color sub-pixel; and
- a memory storing a lookup table, the lookup table including:

a first lookup table including a predetermined compensation value corresponding to predetermined input data of the first color sub-pixel in an N-th frame and input data of the first color sub-pixel in an (N−1)-th frame; and a second lookup table including a first impact factor of input data of the second color sub-pixel in the same pixel unit with the first color sub-pixel to the predetermined input data of the first color sub-pixel in the N-th frame, N>1;

the display method comprising:

obtaining input data of the first color sub-pixel in the N-th frame and the input data of the first color sub-pixel in the (N−1)-th frame;

looking up the predetermined input data of the first color sub-pixel in the N-th frame and the predetermined compensation value corresponding to the input data of the first color sub-pixel in the (N−1)-th frame in the first lookup table;

obtaining the input data of the second color sub-pixel in the same pixel unit in the (N−1)-th frame;

looking up the first impact factor of the input data of the second color sub-pixel in the (N−1)-th frame to the predetermined input data of the first color sub-pixel in the N-th frame from the second lookup table;

calculating an actual compensation value at least according to the predetermined compensation value and the first impact factor;

calculating target input data of the first color sub-pixel in the N-th frame according to the actual compensation value and the predetermined input data of the first color sub-pixel in the N-th frame; and performing display by the first color sub-pixel according to the target input data.

2. The method according to claim 1, wherein calculating the actual compensation value at least according to the predetermined compensation value and the first impact factor includes:

M=offset*Q1, M representing the actual compensation value, offset representing the predetermined compensation value, and Q1 representing the first impact factor.

3. The method according to claim 1, wherein 0≤Q1≤2.

4. The method according to claim 1, wherein:

the pixel unit further includes a third color sub-pixel;

the look-up table further includes a third lookup table, the third look-up table including a second impact factor of input data of the third color sub-pixel in the (N−1)-th frame to the predetermined input data of the first color sub-pixel in the N-th frame in the same pixel unit; and calculating the actual compensation value at least according to the predetermined compensation value and the first impact factor includes M=offset*Q1*Q2, M representing the actual compensation value, offset representing the predetermined compensation value, and Q1 representing the first impact factor, and Q2 representing the second impact factor.

5. The method according to claim 4, wherein 0≤Q2≤2.

6. The method according to claim 4, wherein:

the lookup table further includes a fifth lookup table, the fifth lookup table including a second impact coefficient of different display brightnesses to the first impact factor and the second impact factor; and calculating the actual compensation value at least according to the predetermined compensation value and the first impact factor includes M=offset*Q1*Q2*G2, M representing the actual compensation value, offset representing the predetermined compensation value, and Q1 representing the first impact factor, Q2 representing the second impact factor, and G2 representing the second impact factor.

7. The method according to claim 4, wherein:

the lookup table further includes a seventh lookup table, the seventh lookup table including a fourth impact coefficient of different refresh frequencies to the first impact factor and the second impact factor; and calculating the actual compensation value at least according to the predetermined compensation value and the first impact factor includes M=offset*Q1*Q2*G4, M representing the actual compensation value, offset representing the predetermined compensation value, Q1 representing the first impact factor, Q2 representing the second impact factor, and G4 representing the fourth impact coefficient.

8. The method according to claim 4, wherein:

the lookup table further includes an eighth lookup table, the eighth lookup table including a fifth impact coefficient of different display brightnesses and refresh frequencies to the first impact factor; and calculating the actual compensation value at least according to the predetermined compensation value and the first impact factor includes M=offset*Q1*G5, M representing the actual compensation value, offset representing the predetermined compensation value, and Q1 representing the first impact factor, and G5 representing the fifth impact coefficient.

9. The method according to claim 8, wherein 0≤G5≤16.

10. The method according to claim 4, wherein:

the lookup table further includes a ninth lookup table, and the ninth lookup table including a sixth impact coefficient of different display brightnesses and refresh frequencies to the first impact factor and the second impact factor; and calculating the actual compensation value at least according to the predetermined compensation value and the first impact factor includes M=offset*Q1*Q2*G6, M representing the actual compensation value, offset representing the predetermined compensation value, Q1 representing the first impact factor, Q2 representing the second impact factor, and G6 representing the sixth impact coefficient.

11. The method according to claim 10, wherein 0≤G6≤16.

12. The method according to claim 1, wherein:

the lookup table further includes a fourth lookup table, and the fourth lookup table including a first impact coefficient of different display brightnesses to the first impact factor; and calculating the actual compensation value at least according to the predetermined compensation value and the first impact factor includes M=offset*Q1*G1, M representing the actual compensation value, offset representing the predetermined compensation value, and Q1 representing the first impact factor, and G1 representing the first impact coefficient.

13. The method according to claim 1, wherein:

the lookup table further includes a sixth lookup table, and the sixth lookup table including a third impact coefficient of different refresh frequencies to the first impact factor; and calculating the actual compensation value at least according to the predetermined compensation value and the first impact factor includes M=offset*Q1*G3, M representing the actual compensation value, offset representing the predetermined compensation value, and Q1 representing the first impact factor, and G3 representing the third impact factor.

* * * * *